United States Patent [19]

White

[11] Patent Number: 4,526,916

[45] Date of Patent: Jul. 2, 1985

[54] CROSS-LINKABLE POLYETHYLENE COMPOSITIONS

[75] Inventor: George White, Glenburnie, Canada

[73] Assignee: Du Pont Canada Inc., Montreal, Canada

[21] Appl. No.: 462,380

[22] Filed: Jan. 31, 1983

[30] Foreign Application Priority Data

Feb. 9, 1982 [CA] Canada ................................. 395824

[51] Int. Cl.$^3$ ............................................. C08K 5/51
[52] U.S. Cl. .................................... 524/128; 524/130; 524/132; 524/167; 524/525; 524/535; 525/281; 525/313
[58] Field of Search ............... 524/128, 130, 132, 167; 525/281, 313

[56] References Cited

U.S. PATENT DOCUMENTS 3,137,674  6/1964  Marans et al. ....................... 525/281
4,267,080  5/1981  Yokoyama et al. .................. 525/194
4,307,153 12/1981  Haselier ............................. 524/291
4,440,893  4/1984  Kallenback et al. ................ 524/305

FOREIGN PATENT DOCUMENTS 57-49673  3/1982  Japan .

Primary Examiner—Bernard Lipman

[57] ABSTRACT

A composition particularly adapted for use in a rotational moulding process is disclosed. The composition comprises polyethylene having a density of 0.920–0.970 g/cm$^3$ and a melt index of 10–35 dg/min., 0.3–1.3% by weight of a bis(tert. alkyl peroxyalkyl) benzene, 0.2–1.5% by weight of a co-curing agent selected from triallyl cyanurate, triallyl isocyanurate and 1,2-polybutadiene, 0.01–0.05% by weight of a hindered phenolic antioxidant and 0.01–0.2% by weight of a secondary antioxidant. The preferred secondary antioxidant is tris di(tert.-butyl phenyl) phosphite. The composition may be used in for example, the moulding of tanks, barrels, containers and the like.

14 Claims, No Drawings

CROSS-LINKABLE POLYETHYLENE COMPOSITIONS

The present invention is directed to cross-linkable polyethylene compositions and especially to such compositions capable of being used in rotational moulding processes. In particular the invention relates to cross-linkable polyethylene compositions capable of being rotationally moulded into articles substantially free of bubbles and having good low temperature impact strength properties.

Rotation moulding processes are carried out by feeding a powdered polyethylene composition to a mould and then rotating the mould uniaxially or, usually, biaxially while externally heating the mould so as to form a layer of the powdered polyethylene composition, in molten form, on the inside of the mould. The mould is then cooled, thereby causing the polymer to soldify, and the rotationally moulded article is removed from the mould.

Rotational moulding processes are well known and are widely used in the manufacture of hollow articles especially large hollow articles of complicated sizes and shapes, for example gasoline tanks, barrels, containers, storage tanks and the like. Large articles of uniform wall thickness may be produced. In order to produce articles of commercially acceptable quality using a rotational moulding process, it is important that the polyethylene composition used in the process have melt flow properties such that the molten composition will flow to form a uniform layer on the inside of the mould. However, at the same time, the melt flow properties of the composition must be such that the resultant article has acceptable end-use properties, particularly acceptable low temperature impact strength and environmental stress-cracking resistance.

One method of improving the end-use characteristics of an article rotational moulded from polyethylene is to incorporate a cross-linking agent into the polyethylene composition, for example, a peroxide. In the rotational moulding of such compositions, the polyethylene will flow to uniformly coat the inside of the mould and then be cross-linking agent will cause cross-linking of the polyethylene to increase the molecular weight of the polymer, thereby improving end-use properties of the resultant article.

The use of polyethylene compositions containing cross-linking agents in rotational moulding processes is known. For example, U.S. Pat. No. 4,029,729 of R. L. Rees et al, issued June 14, 1977 discloses the use in rotational moulding processes of polyethylene compositions comprising an ethylene homopolymer or copolymer having a melt index of at least about 10 dg/min. and having incorporated therein a cross-linking acetylenic diperoxy compound. The resultant moulded articles have a high impact strength and a resistance to stress cracking. While rotational moulding resins containing acetylenic diperoxy compounds are commercially available, at least some such diperoxy compounds are known to be skin irritants and eye irritants and as such may be a potential health hazard to persons operating the rotational moulding process.

U.S. Pat. No. 3,876,613 of D. G. Needham et al, which issued Apr. 8, 1975 discloses polymers of ethylene that may be rotationally moulded to produce articles having high impact strength. The disclosed compositions contain both an acetylenic diperoxy compound and an ester of thiodipropionic acid.

The use of cross-linkable polyethylene compositions in rotational moulding processes in which the composition contains both polyethylene and a rubber or elastomer product is also known. For example, U.S. Pat. No. 4,267,080 of T. Yokoyama et al, which issued May 12, 1981 discloses compositions containing 5 to 50 parts by weight, based on 100 parts by weight of the ethylene polymer, of a rubber and/or an elastomer, a cross-linking amount of a peroxide compound and 0.5 to 5 times the amount of the peroxide compound of at least one cross-linking aid selected from 1,2-polybutadiene, triallyl cyanurate and triallyl isocyanurate. The disclosed cross-linking agents are either bis(tert.-alkylperoxy) alkanes or bis(tert.-alkylperoxyalkyl benzenes). Preferred cross-linking agents are stated to be 2,5 bit(tert.-butylperoxy)-2,5, dimethyl-hexane and $\alpha,\alpha'$-bis(tert.-butylperoxypropyl) benzene.

A cross-linkable polyethylene composition has now been found which comprises polyethylene admixed with a cross-linking agent, a co-curing agent, a hindered phenol antioxidant and a secondary antioxidant.

Accordingly, the present invention provides a composition comprising polyethylene having a density of 0.920–0.970 g/cm$^3$ and a melt index in the range of 10–35 dg/min., 0.3–1.3%, by weight of the polyethylene, of a bis(tert. alkyl peroxyalkyl) benzene, 0.2–1.5%, by weight of the polyethylene, of a co-curing agent selected from the group consisting of triallyl cyanurate, triallyl isocyanurate and 1, 2-polybutadiene, 0.01–0.05%, by weight of the polyethylene, of a hindered phenolic antioxidant and 0.01–0.2%, by weight of the polyethylene, of a secondary antioxidant selected from the group consisting of di(stearyl)-pentaerythritol diphosphite, tris di(tert.-butyl phenyl) phosphite, dilauryl thiodipropionate and bis (2,4-di-tert.-butylphenyl) pentaerythritol diphosphite.

In a preferred embodiment of the present invention the peroxide is bis(tert.-butyl peroxyisopropyl) benzene.

The present invention also provides in a rotational moulding process for the manufacture of articles of compositions of polyethylene, the improvement of using a composition comprising polyethylene having a density of 0.920–0.970 g/cm$^3$ and a melt index in the range of 10–35 dg/min., 0.3–1.3%, by weight of the polyethylene, of a bis(tert.-alkyl peroxyalkyl) benzene, 0.2–1.5%, by weight of polyethylene, of a co-curing agent selected from the group consisting of triallyl cyanurate, triallyl isocyanurate and 1, 2-polybutadiene, 0.01–0.05%, by weight of the polyethylene, of a hindered phenolic antioxidant and 0.01–0.2%, by weight of the polyethylene, of a secondary antioxidant selected from the group consisting of di(stearyl)-pentaerythritol diphosphite, tris dr(tert.-butyl phenyl) phosphite, dilauryl thiodipropionate and bis (2,4-di-tert.-butylphenyl) pentaerythritol diphosphite.

The polyethylene that may be used in the composition of the present invention is a polyethylene having a density of 0.920–0.970 g/cm$^3$, especially a density of 0.950–0.970 g/cm$^3$. The density of the polyethylene will depend, in particular, on the intended end-use for the compositions. The polyethylene may be a homopolymer of ethylene or a copolymer of ethylene and a minor amount of $C_4$–$C_{10}$ α-olefin, for example, a copolymer of ethylene and a minor amount of butene-1, hexene-1 or octene-1. Techniques for the manufacture of such polymers are known in the art. The polyethylene may have a melt index in the range of 10–35 dg/min. and especially in the range of 16–26 dg/min., melt index being measured by the method of ASTM D-1238 (condition E).

The composition of the invention contains 0.3–1.3%, by weight of the polyethylene, of a bis(tert. alkyl peroxy alkyl) benzene, especially 0.4–0.9%, by weight of the polyethylene, of the epoxy compound. The preferred peroxide is bis(tert. butyl peroxyisopropyl) benzene. Such a peroxide is commercially available under the trademark Vulcup from Herculus Incorporated. The peroxide may be used in a variety of forms, for example, in a pure form or in a form where it is supported on an inert material, for example, clay. Both forms of the peroxide are commercially available.

In addition to the peroxide, the composition of the invention also contains 0.2–1.5%, by weight of the polyethylene, of a co-curing agent selected from the group consisting of triallyl cyanurate, triallyl isocyanurate and 1, 2-polybutadiene. In a preferred embodiment, 0.4–0.7%, by weight of the polyethylene, of trially cyanurate or triallyl isocyanurate is used as the co-curing agent.

The composition of the invention contains two antioxidants. The first is a hindered phenolic antioxidant, such antioxidants being commonly used in the stabilization of polyethylene. The hindered phenolic antioxidant may be used in amounts of 0.01–0.05%, especially 0.01–0.03%, by weight, of the polyethylene. Examples of suitable hindered phenolic antioxidants are octadecyl-3,5-di-tert.-butyl-4-hydroxycinnamate and tetrakis-methylene-3-(3', 5'-di-tert.-butyl-4-hydroxyphenyl) propionate methane. The second antioxidant is selected from the group consisting of di(stearyl)-pentaerythritol diphosphite, tris di-tert.-butyl phenyl phosphite, dilauryl thiodipropionate and bis(2,4-di-tert.-butylphenyl) pentaerythritol diphosphite. The second antioxidant is used in amounts of 0.01–0.2%, and especially in amounts of 0.06–0.1%, by weight of the polyethylene. The preferred secondary antioxidant is tris di(tert.-butyl phenyl) phosphite, especially for reasons of the colour of the resultant product.

As is illustrated hereinafter, each of the components of the present invention is important in order to produce rotationally moulded articles with acceptable end-use properties. However, if polyethylene is cross-linked using the peroxide of the composition of the invention but in the absence of the other components specified for the composition, the resultant rotationally moulded articles tend to have unacceptable properties. In particular, the articles obtained are susceptible to bubble formation, frequently to such an extent that containers are not capable of holding a liquid without leaking. The peroxide selected is believed to be an acceptable peroxide with respect to potential health hazards when used in the cross-linking of polyethylene, especially with respect to matters of skin and eye irritation.

Co-curing agents are used in the compositions of the present invention in order to suppress bubble formation. The use of a number of co-curing agents in the cross-linking of polyethylene in a rotational moulding process is illustrated in the examples. The two co-curing agents most effective in reducing the formation of bubbles are triallyl cyanurate and triallyl isocyanurate.

The hindered phenolic antioxidant is used for the same reasons as such an antioxidant is used in typical end-uses of polyethylene. Such antioxidants reduce the oxidation of the polyethylene during processing, for example, during the rotational moulding process, and in exposure to the environment of the subsequent end-use. The secondary antioxidant is used in order to impart improved end-use properties, especially improved low temperature impact strength properties. Four secondary antioxidants may be used viz. di(stearyl)-pentaerythritol diphosphite, tris di-tert. butyl phenyl phosphite, dilauryl thiodipropionate or bis(2,4-di-tert.-butylphenyl) pentaerythritol diphosphite. The preferred secondary antioxidant is tris di-tert. butyl phenyl phosphite as use of that secondary antioxidant tends to result in the rotational moulding of products of improved colour. The latter antioxidant is commercially available from Ciba-Geigy Canada Ltd. under the trademark Irgafos 168. The compositions of the present invention are particularly intended for use in the manufacture of articles using a rotational moulding process. As such the compositions are preferably in the form of a powder rather than pellets, especially a powder capable of passing through a Number 32 Tyler* mesh screen.
*denotes trade mark.

The compositions may be formed by feeding polyethylene in pellet form to an extruder especially an extruder equipped with a suitable mixing screw. The hindered phenolic antioxidant would normally be incorporated into the polyethylene prior to the polyethylene being fed to the extruder, especially during manufacture of the polyethylene. The remaining additives may be blended with the polyethylene through the use of concentrates and/or by metering the additive into the extruder, for example through the barrel of the extruder. In particular additives may be metered into the extruder using a carrier, especially paraffin oil, as is disclosed in Canadian Pat. No. 957 473 of H. J. Cook, which issued Nov. 12, 1974. The compositions of the present invention may be converted to a form suitable for rotational moulding by techniques known in the art, for example by grinding of pelletized compositions of the invention.

Articles may be produced from compositions of the invention by rotational moulding techniques. In a rotational moulding process, polymer, usually in powdered form, is fed to the mould which is then rotated. In a rotational moulding process the mould is normally rotated about at least two axes while being heated to a temperature such that the powdered composition will form a substantially uniform layer of molten polymer on the inside of the mould. As the temperature is further increased cross-linking of the polymer of the composition of the invention occurs. Subsequently the mould is cooled and the moulded article is removed. In rotational moulding the compositions of the present invention, the temperature in the rotational moulding oven should be in the range of about 260° to 350° C. Higher temperatures and/or prolonged heating at elevated temperatures may result in unacceptable, for example scorched, articles, as is known in the art.

In a preferred embodiment the rotational moulding process is operated so that the gel content of the polymer of the moulded article is at least 75% and especially in the range of 80–90%. As used herein, gel refers to that matter which remains after Soxhlet extraction of polyethylene using xylene as solvent and a No. 200 Tyler mesh wire screen in the extraction apparatus.

Moulded articles formed by rotational moulding techniques from the compositions of the present invention may be used in a variety of end-uses, for example as gasoline tanks, barrels, containers, storage tanks and the like. The compositions of the invention are also capable of being used as a linear for drums and in the pipe and wire-coating industries.

The present invention is illustrated by the following examples:

EXAMPLE I

A number of cross-linkable compositions of the invention and comparative cross-linkable compositions were prepared. Powdered polyethylene containing a hindered phenolic antioxidant was admixed with liquid additives in a high-speed laboratory mixer. The resultant mixture was then melt-blended at a melt temperature of 140° C. using a single screw extruder. The extrudate from the extruder was pelletized and then ground to a fine powder of the type normally used in a rotational moulding process.

A quantity of the powder was placed in a stationary mould which was open to the air at the top and heated from the bottom. The temperature of the mould was raised from ambient temperature to about 200° C. over a period of about 20 minutes. The mould was then cooled and a disc having a thickness of 5 mm and a diameter of 50 mm was removed and tested.

Further experimental details and results obtained are summarized in Table 1.

EXAMPLE II

Four cross-linkable polyethylene compositions of the invention were prepared by melt-blending the ingredients of the composition using a 60 mm single screw extruder and a melt temperature of 140° C. The polyethylene was fed to the hopper of the extruder in pellet form while the remaining ingredients were injected, in liquid form, through a port on the side of the extruder. The extrudate from the extruder was cut into pellets and then ground to a No. 35 Tyler mesh powder.

The powder was rotationally moulded into 14.2 L boxes having a wall thickness of 0.33 cm and five gallon jerry cans having a wall thickness of 0.44 cm in an oven maintained at a temperature of 288° C.

The jerry cans were tested by filling the cans with ethylene glycol, cooling the cans to −25° C. and then dropping them from a height of 6.1 meters.

Further experimental details and the results obtained are summarized in Tables II and III.

EXAMPLE III

Two cross-linkable polyethylene compositions were prepared using the procedure of Example II. In one composition the polyethylene was Sclair ® 2910 polyethylene and in the other it was Sclair ® 2911 polyethylene, details of which are given hereinafter. Both polyethylene contain a hindered phenolic antioxidant. The additives used in the compositions were as follows (all percentages are on a weight basis):

| 0.5% | Vulcup R peroxide |
| 0.5% | triallyl cyanurate |
| 0.5% | mineral oil |
| 0.075% | Irgafos 168 antioxidant |

Drums having a capacity of 33 gallons were made from each composition using commercial rotational moulding equipment and an oven temperature of 260°–288° C. The gel contents of the drums thus obtained were measured and found to be in the range of 80–90% depending on the cycle time used in the rotational moulding process. The drums were free of holes or bubbles.

The drums were filled with a glycol solution at a temperature of −21° C. and then dropped from a height of 4 meters. None of the drums failed on impact.

EXAMPLE IV

A cross-linkable polyethylene composition was prepared using the procedure of Example II. The polyethylene was Sclair ® 2910 polyethylene and the additives used in the composition were as follows (all percentages are on a weight basis):

| 0.4% | Vulcup R peroxide |
| 0.6% | triallyl isocyanurate |
| 0.5% | mineral oil |
| 0.07% | Irgafos 168 antioxidant |

A number of 4100 liter storage tanks having a wall thickness of 7.5 mm were rotational moulded from the composition using an oven temperature of 315° C. and a cure time of 24 minutes. The walls of the tanks obtained were free of bubbles and the gel content of the polymer was 84%.

Plaques measuring 10 cm by 10 cm were cut from the walls of the tanks, cooled to −40° C. and subjected to an impact test using a dart having a diameter of 2.5 cm and a weight of 6 kg. None of the plaques broke when the dart was dropped from a height of 3 meters onto the plaques.

EXAMPLE V

A cross-linkable polyethylene composition was prepared using the procedure of Example II. The polyethylene was SCLAIR ® 2910 polyethylene and the additives used in the composition were as follows (all percentage are on a weight basis):

| 0.55% | Vulcup R peroxide |
| 0.55% | triallyl isocyanurate |
| 0.55% | mineral oil |
| 0.1% | bis(2,4-di-tert.-butylphenyl) pentaerythritol diphosphite, available from Borg-Warner under the trade mark MDW-626. |

The powdered cross-linkable resin was rotationally moulded into 14.2 L boxes having a wall thickness of 0.63 cm. Plaques measuring 10 cm in diameter were cut from the walls of the boxes, cooled to −40° C. and subjected to an impact test using a dart having a diameter of 2.5 cm and a weight of 6.5 kg. None of the plaques broke when the dart was dropped from a height of 3 meters onto the plaques.

TABLE I

| ADDITIVES | RUN NO.* | | | | | | |
| --- | --- | --- | --- | --- | --- | --- | --- |
| | 1 | 2 | 3 | 4 | 5 | 6 | 7 |
| PEROXIDE | | | | | | | |
| Type | LUPERSOL 130 | DICUP R | VULCUP R | VULCUP R | VULCUP R | VULCUP R | VULCUP R |

TABLE I-continued

| | | | | | | | |
|---|---|---|---|---|---|---|---|
| Wt. % CO-CURING AGENT | 0.8 | 1.1 | 0.9 | 0.45 | 0.45 | 0.8 | 0.45 |
| Type | — | — | — | — | DIAK 7 | — | DIAK 7 |
| Wt. % MINERAL OIL | — | — | — | — | 0.5 | — | 0.2 |
| Wt. % SECONDARY ANTIOXIDANT | 0.8 | 0.9 | 0.9 | 0.9 | 0.9 | 0.9 | 0.9 |
| Type | DLTDP | DLTDP | DLTDP | DLTDP | DLTDP | IRGAFOS 168 | IGAFOS 168 |
| Wt. % | 0.1 | 0.1 | 0.1 | 0.1 | 0.1 | 0.1 | 0.1 |
| GEL IN DISK (%) | | | | 72 | 75 | 80 | 78 |
| COMMENTS** | Bubble free | Almost sponge-like | Over 100 holes, size ca. 1-2 mm | Over 20 holes, size ca. 1-2 mm | Bubble free | About 30 holes size ca. 2-1 mm | Bubble free |

| | ADDITIVES | RUN NO. | | | | |
|---|---|---|---|---|---|---|
| | | 8 | 9 | 10 | 11 | 12 |
| | PEROXIDE | | | | | |
| | Type | VULCUP R | VULCUP R | VULCUP R | VULCUP R | VULCUP R |
| | Wt. % | 0.55 | 0.45 | 0.45 | 0.45 | 0.50 |
| | CO-CURING AGENT | | | | | |
| | Type | HVA-2 | HVA-2 | RICON 150 | RICON 154 | CHEMLINK 30 |
| | Wt. % | 0.2 | 0.1 | 0.9 | 0.9 | 0.25 |
| | MINERAL OIL | | | | | |
| | Wt. % | 0.9 | 0.9 | — | — | — |
| | SECONDARY ANTIOXIDANT | | | | | |
| | Type | DLTDP | IRGAFOS 168 | DLTDP | DLTDP | DLTDP |
| | Wt. % | 0.1 | 0.1 | 0.1 | 0.1 | 0.075 |
| | GEL IN DISK (%) | 52 | 64 | 74 | 76 | — |
| | COMMENTS | About 100 holes mostly ca. 1 mm | Some very large bubbles | Bubble free | About 6 size ca. 1 mm holes | About 15 bubbles |

*Runs 1 and 2 are comparative examples
**The holes referred to were partially and/or completely through the disc.
LUPERSOL 130 2,5-dimethyl-2,5-di(t-butylperoxy) hexyne-3, trademark of Wallace and Tiernan Inc.
DICUP R dicumyl peroxide, trademark of Hercules Incorporated
DIAK-7 triallyl isocyanurate, trademark of E. I. du Pont de Nemours and Company
DLTDP dilauryl thiodipropionate
HVA-2 N—N$^1$m-phenylene dimaleimide, trademark of E. I. du Pont de Nemours and Company
IRGAFOS 168 tris di(tert.-butyl phenyl)phosphite, trademark of Ciba-Geigy
RICON 150 1,2-polybutadiene (MW 2000), trademark of Colorado Chemical Specialty Co.
RICON 154 polybutadiene (MW 3000), trademark of Colorado Chemical Specialty Co.
CHEMLINK 30 trimethylol propane/trimethylacrylate, trademark of Ware Chemical Co.

TABLE II

BOX MOULDING

| COMPOSITION | RUN NO. | | | |
|---|---|---|---|---|
| | 13 | 14 | 15 | 16 |
| POLYETHYLENE* | A | A | B | A |
| PEROXIDE (wt %) | 0.5 | 0.5 | 0.5 | 0.44 |
| CO-CURING AGENT | | | | |
| Diak 7 (wt. %) | — | 0.25 | 0.25 | 0.44 |
| Ricon 150 (wt. %) | 1.25 | — | — | — |
| ANTIOXIDANT | | | | |
| DLTDP (wt. %) | 0.10 | — | — | 0.10 |
| Irgafos 168 (wt. %) | — | 0.075 | 0.075 | — |
| MINERAL OIL (wt. %) (SUS 350) | — | 1.0 | 1.0 | 1.0 |
| TIME IN OVEN (min.) | 19 | 21 | 21 | 19 |
| YELLOWNESS INDEX** | | | | |
| Outside Surface | 20 | 4.2 | 2.4 | 23 |
| Inside Surface | 39 | 4.3 | 2.0 | 25 |
| GEL (%) | 75 | 80 | 75 | 85 |
| BUBBLE COUNT | Nil | Nil | Nil | Nil |

TABLE II-continued

BOX MOULDING

| COMPOSITION | RUN NO. | | | |
|---|---|---|---|---|
| (Visual) | 13 | 14 | 15 | 16 |

*A = Sclair ® 2910 polyethylene, having a density of 0.960 dg/cm$^3$ and a melt index of 18 dg/min, containing 0.025% by weight, of a hindered phenolic antioxidant, available from Du Pont Canada Inc.
B = Sclair ® 2911 polyethylene, similar to A above, except melt index was 25 dg/min.
 = Yellowness index was measured using a Hunter* Model D-25 Optical Sensor, a L/a/b type colour/colour difference spectrophotometer.
***denotes trademark

TABLE III

JERRY-CAN MOULDING

| COMPOSITION | RUN NO. | | | |
|---|---|---|---|---|
| | 13A | 14A | 15A | 16A |
| POLYETHYLENE | A | A | B | A |
| PEROXIDE (wt %) | 0.5 | 0.5 | 0.5 | 0.44 |
| CO-CURING AGENT | | | | |
| Diak 7 (wt. %) | — | 0.25 | 0.25 | 0.44 |

TABLE III-continued

| COMPOSITION | JERRY-CAN MOULDING RUN NO. | | | |
|---|---|---|---|---|
| | 13A | 14A | 15A | 16A |
| Ricon 150 (wt. %) | 1.25 | — | — | — |
| ANTIOXIDANT | | | | |
| DLTDP (wt. %) | 0.1 | — | — | 0.1 |
| Irgafos 168 (wt. %) | — | 0.075 | 0.075 | — |
| MINERAL OIL (wt. %) (SUS 350) | — | 1.0 | 1.0 | 1.0 |
| TIME IN OVEN (min.) | 20 | 22 | 22 | 20 |
| YELLOWNESS INDEX | | | | |
| Outside Surface | 22 | 4 | 2 | 25 |
| Inside Surface | 40 | 4 | 2 | 27 |
| GEL (%) | 75 | 80 | 73 | 86 |
| DROP TEST | Passed | Passed | Failed | Passed |

I claim:

1. A composition consisting essentially of polyethylene having a density of 0.920–0.970 g/cm³ and a melt index in the range of 10–35 dg/min., 0.3–1.3%, by weight of the polyethylene, of a bis(tert. alkyl peroxyalkyl) benzene, 0.2–1.5%, by weight of the polyethylene, of a co-curing agent selected from the group consisting of triallyl cyanurate, triallyl isocyanurate and 1,2-polybutadiene, 0.01–0.05%, by weight of the polyethylene, of a hindered phenolic antioxidant and 0.01–0.2%, by weight of the polyethylene, of a secondary antioxidant selected from the group consisting of di(stearyl)-pentaerythritol diphosphite, tris di(tert.-butyl phenyl) phosphite, dilauryl thiodipropionate and bis(2,4-di-tert.-butylphenyl) pentaerythritol diphosphite.

2. The composition of claim 1 in which the co-curing agent is 1,2-polybutadiene.

3. The composition of claim 1 in which the co-curing agent is triallyl cyanurate or triallyl isocyanurate.

4. The composition of claim 3 in which the amount of co-curing agent is 0.4–0.7% by weight of the polyethylene.

5. The composition of claim 1 in which the polyethylene is a homopolymer of ethylene.

6. The composition of claim 1 in which the polyethylene is a copolymer of ethylene and a $C_4$–$C_{10}$ α-olefin.

7. The composition of claim 1 in which the polyethylene has a density of 0.950–0.970 g/cm³.

8. The composition of claim 1, in which the peroxide is bis(tert.-butyl peroxyisopropyl)benzene.

9. The composition of claim 1 in which the secondary antioxidant is di(stearyl)-pentaerythritol diphosphite.

10. The composition of claim 1 in which the secondary antioxidant is tris di-tert.-butylphenyl phosphite.

11. The composition of the claim 1 in which the secondary antioxidant is dilauryl thiodipropionate.

12. The composition of claim 1 in which the secondary antioxidant is bis(2,4-di-tert.-butylphenyl) pentaerythritol diphosphite.

13. The composition of claim 1 in which the amount of peroxide is 0.4–0.9% by weight of the polyethylene.

14. The composition of claim 1 in which the density of the polyethylene is 0.950–0.970 g/cm³, the peroxide is bis(tert.-butyl peroxyisopropyl) benzene in an amount of co-curing agent is 0.4–0.7% by weight of the polyethylene and the secondary antioxidant is tris di-tert.-butylphenyl phosphite.

* * * * *